UNITED STATES PATENT OFFICE.

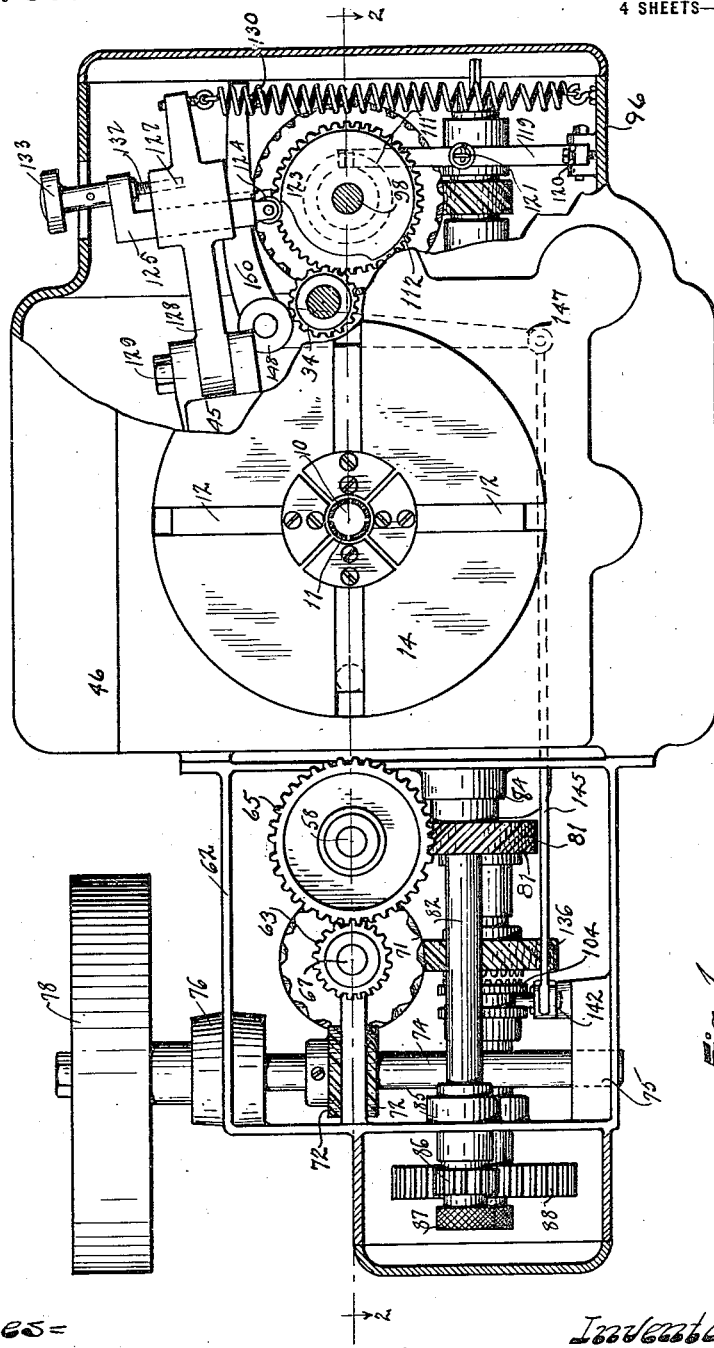

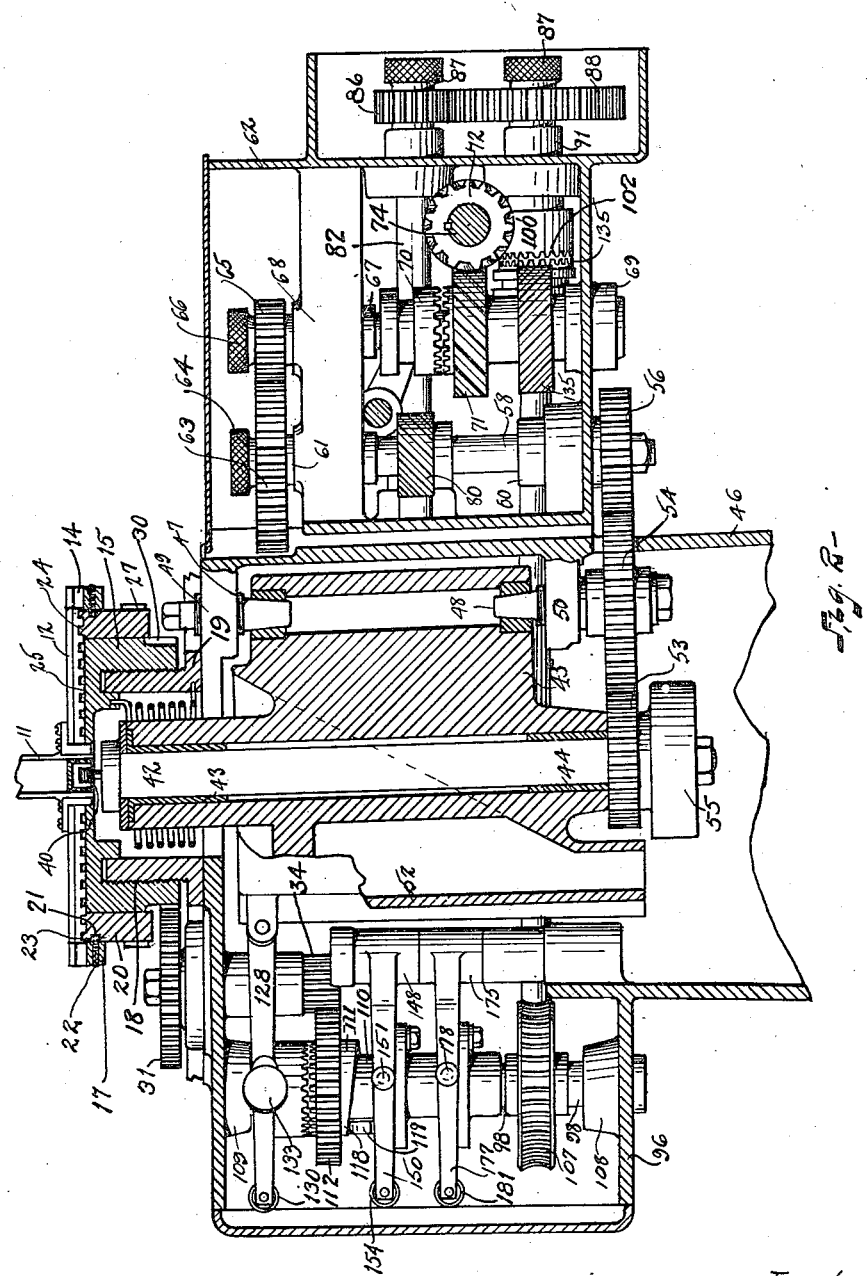

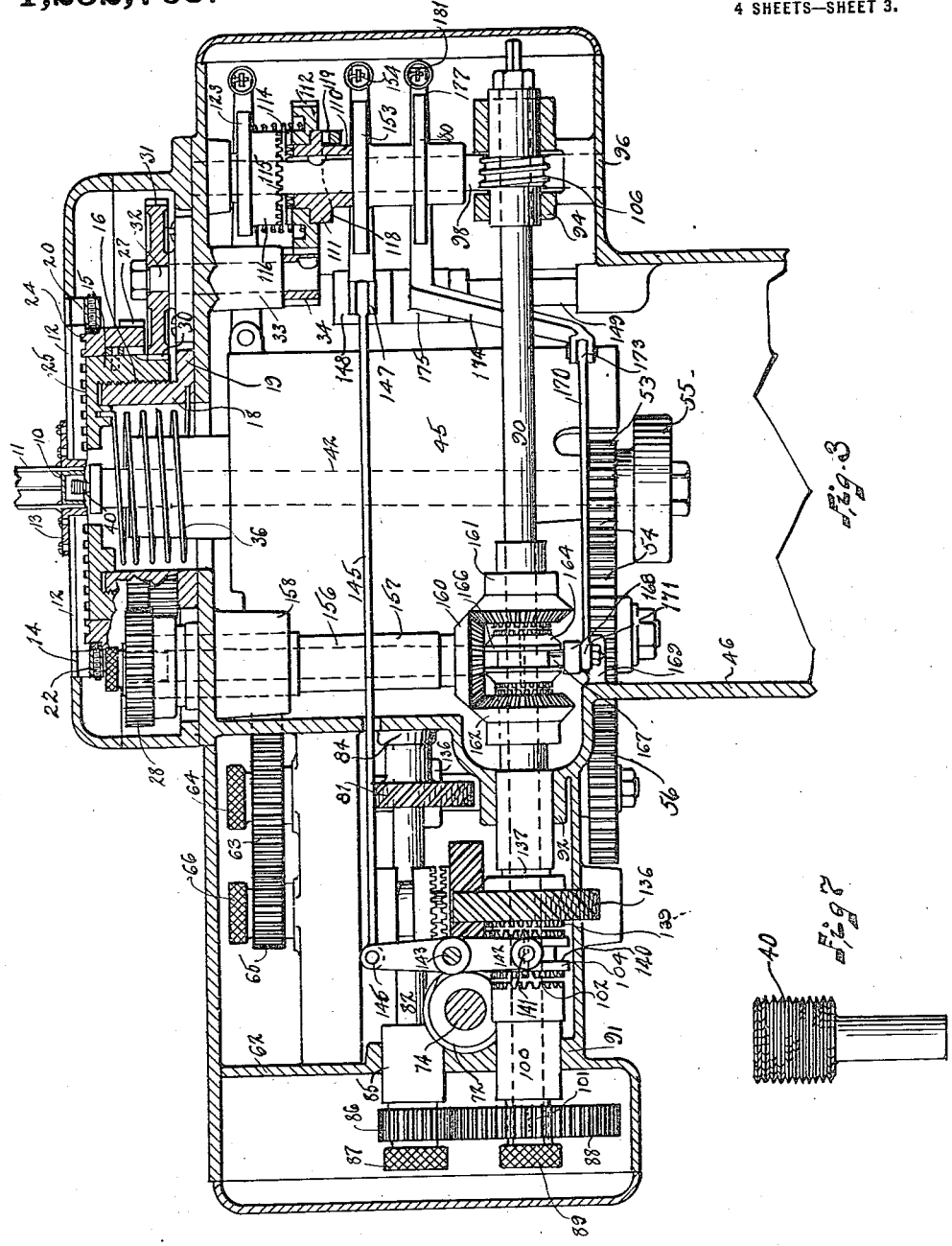

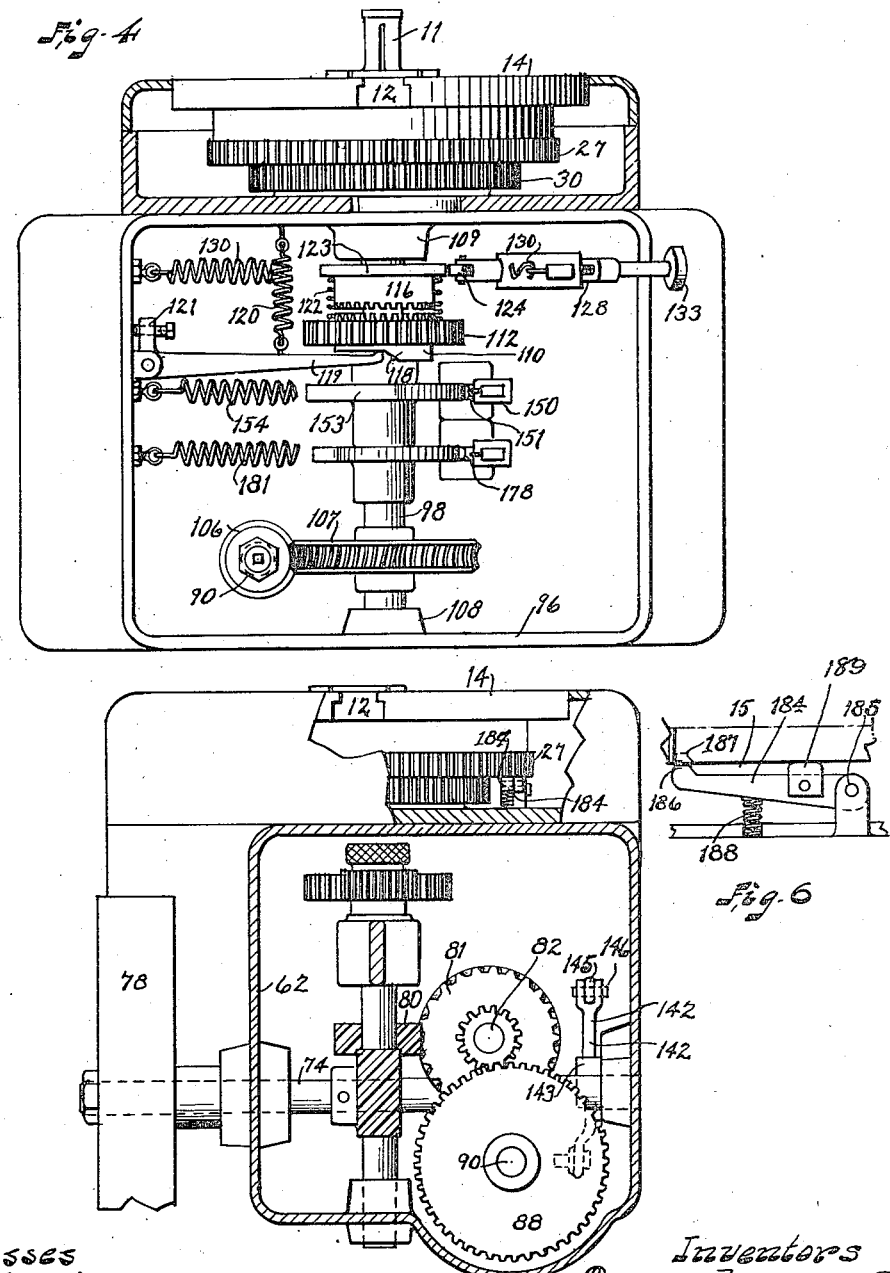

OSCAR ZERK, OF CLEVELAND, AND GEORGE W. DRAKE, OF SOUTH EUCLID, OHIO, ASSIGNORS, BY MESNE ASSIGNMENTS, TO GEORGE W. BOWEN, OF AUBURN, NEW YORK.

THREAD-MILLING MACHINE.

1,252,763.   Specification of Letters Patent.   Patented Jan. 8, 1918.

Application filed July 31, 1913. Serial No. 782,183.

*To all whom it may concern:*

Be it known that we, OSCAR ZERK and GEORGE W. DRAKE, residing at Cleveland and South Euclid, both in the county of Cuyahoga and State of Ohio, respectively, have invented a certain new and useful Improvement in Thread-Milling Machines, of which the following is a full, clear, and exact description, reference being had to the accompanying drawings.

This invention is for a machine for milling a threaded portion on small articles, such as screws, nuts, grease cup parts or any articles on which it is desirable to form accurate external or internal threads. An object of the invention is to provide an accurate, rapidly operating machine, for quickly forming such threads. Another object is to enable such a machine to operate automatically and with very little attention of the operator. Still another object is to provide a machine for this purpose which may be readily used with a suitable automatic feeding mechanism, allowing one operator attend to several machines.

Our machine comprises an automatically operated scroll chuck for holding the article to be milled, a multiple cutter adapted to mill several threads at the same time, a swinging cutter spindle carrying such cutter, and an improved mechanism for causing the cutter and chuck to coöperate to form the desired thread. The chuck is so arranged that it is adapted to move along its axis as it is rotated. The axis of the cutter is at an angle to the axis of the chuck, so that the cutting surfaces thereof move in a direction corresponding to the direction of the thread: In other words, the angle of the axis of the cutter to the axis of the chuck corresponds to the pitch angle of the thread. As the chuck makes one rotation, it is advanced along the cutter a distance equal to the pitch of the thread, so that as it completes one rotation, and just enough over to blend the ends of the threads together, the threaded portion is completed.

The means by which the operation of the chuck and cutter are controlled in the above manner to cut threads in an article may comprise a series of cams, a cam for swinging the cutter to feed in to the work, a cam for controlling the intermittent rotation of the chuck, a cam for controlling the opening and closing of the chuck, and a cam for controlling the gear driving mechanism to change the speed of the machine, so that it may run slowly during the milling operation and rapidly during the remainder of the movements.

In the form shown in the drawings, our machine is particularly adapted for milling internal threads on caps, for example, grease-cup caps.

The invention will be more fully described in connection with these drawings and its essential characteristics hereinafter set forth in the claims.

In the drawings, Figure 1 is a plan of our machine, the frame being partly broken away to show parts of the mechanism. Fig. 2 is a vertical central section through the machine taken substantially on the line 2—2 of Fig. 1, showing a portion of the gearing and the cam operating mechanism in elevation. Fig. 3 is a vertical section taken through the frame of the machine, showing the operating mechanism in elevation, a portion of the chuck and its driving mechanism being shown in sections. The plane of this view is substantially parallel with the plan of Fig. 2, but is taken looking in the opposite direction. Fig. 4 is an end view of the machine with the portion of the frame broken away to show the chuck, and the cover of the cam box is removed to show the cams and their driving mechanism in elevation. Fig. 5 is an end elevation of the driving mechanism at the opposite side of the machine from Fig. 4 showing a portion of the driving mechanism and the chuck in elevation. Fig. 6 is a detailed view of a device for stopping the chuck on its return movement. Fig. 7 is an enlarged view of the cutter used in our machine.

This thread milling machine comprises generally, a chuck, means for automatically opening and closing the chuck, means for rotating the chuck intermittently in one direction, means for returning the chuck to its starting position, a cutter, means for controlling the movement of the cutter into and out of cutting position, and actuating mechanism for the movable parts of the machine.

10 in the drawings indicates the cap which may be inserted into the chuck, allowing the chuck to engage the cap itself or may be carried in a suitable spring collet 11 into which the cap may be inserted, and the outside of which is engaged by the jaws of the chuck. Several of these collets may be used and form part of an automatic feeding mechanism or may be used separately, the cap inserted and the collet then placed into the machine by hand. A suitable automatic feeding mechanism may form a part of our machine. Such a feeding mechanism, however, will be made the subject matter of a separate application of George W. Drake.

The chuck shown comprises four jaws 12 which are guided by suitable grooves in the head 14, which has solid therewith a cylindrical ring 15 threaded on the interior at 16, to engage corresponding threads on the cylindrical bearing 18 carried on the top of the machine secured thereto by a suitable flange 19. Surrounding this cylindrical ring 15, is another ring 20 loosely carried thereon supported by suitable rollers 21 on the inner ends of screws 22 occurring at intervals around a depending portion 17 of ring 15, and engaging a shoulder 23 on the ring 20. The upper side of this ring 20 is provided with scroll threads 24, which engage corresponding teeth 25 on the lower edge of t' e jaws 12. Thus as this ring 20 is rotated, the jaws 12 are caused to move inwardly or outwardly depending upon the direction of the rotation. Gear teeth 27 are provided on the lower edge of the outside surface of this ring 20, and a suitable gear 28 in engagement with the gear teeth 27 is adapted to open and close the chuck by means of mechanism to be hereinafter described.

On the lower edge of the outside surface of the ring 15 are similar gear teeth 30, the tops of which are made even with the outer surface of the ring 15, to allow for passing the ring 20 over the ring 15. A gear 31 is carried on the short shaft 32 having a bearing at its lower end by which the shaft and gear 31 is rotated to rotate the chuck for the milling operation. Inside the bearing member 18 is coiled spring 36 having one end secured to the chuck body 14, and the other to the bearing 18. This spring acts to return the chuck to the starting position after the milling operation.

The cutter for milling the threads is indicated at 40, and suitably carried in the upper end of a spindle 42 having bearings 43 and 44 in the swinging arm 45. This arm 45 is pivoted on adjustable taper bearings 47 and 48, suitably screwed in the bearing members 49 and 50 integral with the frame of the machine. The axis of these bearings is made at a slight angle from the vertical axis of the chuck, so that the spindle which is carried parallel with the axis of the bearings, may carry its cutter at an angle equivalent to the pitch angle of the threads to be milled in the cap. This swinging arm 45 as shown, has an opening 52 therethrough, forming a chute for the oil and chips from the cutter. Rigidly carried on the lower end of the spindle 42 is a gear 53 meshing with a gear 54 meshing in turn with the gear 56 on the lower end of the vertical shaft 58. A balance wheel 55 on the spindle causes the cutter to run smoothly.

The shaft 58 is suitably journaled in bearings 60 and 61 of a gear box 62, carried on the side of the frame 46, and has its axis parallel with the axis of the cutter spindle 42. On the upper end of the shaft 58 is a gear 63 rigidly secured thereto by means of a nut 64. The gear 63 is adapted to mesh with a gear 65 on the upper end of a shaft 67, which is also carried in suitable bearings 68 and 69 in the gear box 62. This shaft 67 is parallel with the shaft 58 and the spindle 42, so that the gears 65 and 63 may be ordinary spur gears. For the same reason the shaft 58 and the gear 54 are made in proper alinement with the spindle 42, so that the gears 53, 54 and 56 may be made ordinary spur gears. Carried on the shaft 67 and adapted to be clutched and unclutched therewith by means of a slidable clutch 70 is a spiral gear 71 meshing with another spiral gear 72 rigid on the driving shaft 74, which is carried in suitable bearings 75 and 76 (Fig. 1) in the gear box 62 and carries at its outer end a suitable driving pulley 78.

During the driving operation the power is transmitted to the cutter through the shaft 74, the gear 72 and the gear 71 to the shaft 67, through the gears 65 and 63 to the shaft 58, thence through the gears 56, 54 and 53 to the cutter spindle 42, thus driving the cutter. To allow for regulating the speed of the cutter for various kinds of metal of which the cap is made and cause such speed to correspond with the various sizes of cutters which may be used, the gears 63 and 65 are made removable, and interchangeable by means of the nuts 64 and 66, it being only necessary to place any combination of change gears on the shafts 58 and 67 to obtain the desired speed.

The mechanism for driving the gear 28 to open and close the chuck, and mechanism for driving the gear 31 to rotate the chuck will now be described. Rigid with the shaft 58 is a suitable gear 80 which meshes with a corresponding spiral gear 81 carried on a short horizontal shaft 82, which is mounted in suitable bearings 84 and 85 in the gear box 62. On the outer end of the shaft 82 is carried a suitable gear 86 secured thereto by a hand nut 87 and meshing with a gear 88 which is secured by means of a hand nut 89 to a horizontal shaft 90. The shaft 90 extends transversely through the frame 46 of the machine, and has bearings 91 and 92 in the gear box, and a bearing 94 in a box-like portion 96 preferably made integral with the frame, and inclosing a cam shaft 98.

During the milling operation the shaft 90 is driven as follows: The shaft 58 is driven through the gears 65 and 63 and the mechanism heretofore described. Motion is transmitted through the gear 80 on the shaft 58 and gear 81 meshing therewith to the shaft 82, the gears 86 and 88, to a clutch member 100, to which the gear 88 is rigidly secured by the hand nut 89. This clutch member is loose on the shaft 90, and may rotate freely thereon or be clutched with the shaft as follows: The clutch member 100 has teeth 102, adapted to be engaged by corresponding teeth on a slidable clutch member 104, which is suitably splined to the shaft 90. Thus when the gears 86 and 88 are rotated as described, the clutch 100 rotates the shaft 90 during the milling operation by means of its engagement with the clutch member 104.

The chuck is rotated during the milling operation by the following mechanism: Carried between the two parts of the bearing 94 is a worm 106 meshing with a worm gear 107, rigidly carried on the lower end of the cam shaft 98 heretofore mentioned, which has bearings 108 and 109 in the box-like portion 96 of the frame of the machine. Splined to the shaft 98 is a slidable collar 110 having an annular flange 111 (Fig. 3) against which rests a gear 112, meshing with the gear 34. This gear 112 is loosely carried on the collar 110, and has clutch teeth 114 on the hub adapted to mesh with corresponding clutch teeth 115 on a collar 116 rigid on the shaft 98. When the collar 110 is shoved upwardly the teeth 114 engage the teeth 115, thus connecting the shaft 98 with the gear 112, and, accordingly, rotate the gear 34, shaft 32 and the gear 31 which rotates the chuck, by means of its engagement with the teeth 30 on the chuck member 15.

The chuck, as before stated, is rotated slightly more than one complete rotation, and then released allowing the spring 36 to return it to starting position. To provide for this intermittent driving of the chuck, the clutch teeth 114 on the gear 112, just described, are caused to engage the teeth 115 for a portion only of the rotation of the cam shaft.

The ratio between the gears 112 and 34, and the gear 31 and the chuck member is such that less than a complete rotation of the gear 112 is sufficient to give the chuck the required rotation.

To clutch and unclutch this gear 112 we provide on the lower side of the flange 111 a suitable cam 118. In engagement with this cam is a lever 119 pivoted to the side of the frame box 96. This lever 119 normally bears upwardly on the cam 118 under the influence of a spring 120 suitably attached to the top of the frame box. Now, as the rise of the cam 118 engages the nose of the lever 119, the collar 110 is raised upwardly by the spring 120 carrying the gear 112 with it, causing the clutch teeth 114 to engage the teeth 115 the required length of time. The lever is raised by means of a spring to allow for the clutch teeth slipping into engagement in case the teeth should engage the tops of each other when the collar is raised. A short arm 121 on the lever 119 has a set screw abutting the side of the frame box to limit the upward movement of the lever. This allows the gear 112 to move downwardly, under the influence of a spring 122, surrounding the collar 116 and the hub of the gear 112, when the lower part of the cam comes over the nose of the lever.

Rigid with the collar 116 on the cam shaft 98 is a cam 123 which acts to feed the cutter into the cap in the following manner. Bearing against the face of this cam is a roller 124 carried in a slide 125 (Fig. 1) suitably held in an enlargement 127 on the lever 128. The lever 128 is rigidly attached at 129 to the swinging arm 45, carrying the cutter spindle 42. A spring 130 attached to the lever 128 and to the side of the frame portion 96 causes the roller 124 to bear against the face of the cam 123. Thus as the cam shaft 98 is rotated, a suitable rise in the cam 123 feeds the cutter into the cap, and a cylindrical portion of the cam holds the cutter into the cutting position for required length of time, and then cut-away portion of the cam releases it, the action of the spring 130 drawing the cutter out of its cutting position. The slide 125 may be adjusted to regulate the position of the cutter spindle, and the depth of the cut, by means of screw 132 screwing into the enlargement 127, a suitable hand knob 133 being provided on the screw 132 for rotating it. This knob is preferably extended outside of the frame box machine, so that it may be easily accessible.

After the milling operation it is desirable to increase the speed of the operating mechanism of the machine, to open and close the chuck quickly for the insertion of the new cap, and to return the parts quickly to starting position for the next milling operation. In case a feeding mechanism is used for the machine and controlled by parts of the mechanism hereinafter described, it is desirable to run the machine more rapidly while the finished cap is being removed thereby, and a new one put in the chuck, so that the minimum time will be lost during this operation. Accordingly, we have provided a gear mechanism for driving the shaft 90 more directly from the shaft 74 and more rapidly than by the gear driving mechanism heretofore described.

Rigidly carried on the shaft 67 is a spiral gear 135 adapted to drive a spiral gear 136, loosely carried on a collar 137 on the shaft 90. The hub of this gear 136 is provided with clutch teeth 139 which are adapted to be engaged by corresponding clutch teeth on the clutch member 104, heretofore mentioned. Thus when the clutch member 104 is moved into engagement with the gear 136 the shaft 90 is driven directly through the gears 72 and 71, and the gears 135 and 136. It is to be understood that the ratios of these gears are such, that the shaft 90 will then be rotated at a speed nearly as fast as the driving shaft 74, being much more rapid than when driven through the change gears 65 and 63, back through the gear 86 and the gear 88 on the shaft 90, for the gear 65 is normally much smaller than the gear 63, and the gear 86 is correspondingly smaller than the gear 88. These, however, being change gears may be adjusted to any suitable speed for the milling operations.

To shift the clutch member 104 to increase the speed of the machine, as heretofore described, the clutch member is provided with a peripheral groove 140 engaging a roller 141 carried on the lower end of the lever 142, which is pivoted at 143 to the gear box 62. A rod 145 is pivotally attached at 146 to the lever 142, and has its other end attached to an arm 147 of a suitable bell crank 148, pivotally carried on an upright post 149 mounted on the frame of the machine. The other arm 150 of this bell crank carries a suitable projection 151 which engages a cam 153 rigid on a cam shaft 98. The end of the arm 150 is attached to a spring 154 having its opposite end attached to the side of the frame box 96, similar to the spring 130 heretofore mentioned. This spring 154 acts to keep the projection 151 bearing against the face of the cam 153. Accordingly, when a suitable depression of the cam 153 comes opposite the projection 151 on the bell crank, the spring 154 moves the bell crank to push the rod 145 to the left (Figs. 1 and 3), thus moving the lever 142, and swinging the clutch member 104 into engagement with the gear 136 to drive the shaft 90 more rapidly through the gear mechanism above described.

The gear 28 (Fig. 3), which acts to rotate the scroll ring 20 of the chuck is carried on the upper end of a shaft 156, with which it has a suitable frictional engagement, to prevent the chuck gripping the cap too tight. As shown, a hand nut 155 on this shaft bears against a suitable fiber washer, pushing the gear against a shoulder on the end of the shaft. Thus, after the cap is suitably gripped, a further rotation of the shaft merely slips harmlessly at the gear 21. The shaft 156 is rotatably carried in a bearing sleeve 157 rigidly mounted in a downwardly projecting portion 158 of the frame. This sleeve 157 extends substantially the full length of the shaft 156, to add to the rigidity of the shaft. On the lower end of the shaft is rigidly carried a bevel gear 160, which meshes at each side with gears 161 and 162, loosely carried on the shaft 90. The inner hubs of the gears 161 and 162 are provided with clutch teeth adapted to engage a clutch member 164 splined to the shaft 90. It will be seen that by this arrangement, that when the clutch member 164 is in engagement with the gear 161, this gear would drive the gear 160 to rotate the scroll ring in one direction, and that in the other position the gear 162 being clutched with the shaft 90 would drive the gear 160, and accordingly, the scroll ring in the other direction. Thus, by shifting the clutch member 164 to engage the gears 161 and 162 alternately, the scroll ring may be driven in one direction to open the chuck, allowing the removal of the cap, and then in the other direction causing the jaws of the chuck to grasp a fresh cap.

To do this at the proper time, and to hold the clutch member 164 in a neutral position during the milling operation, the clutch member is controlled by the cam shaft, as follows: On the clutch member is a peripheral groove 166, which engages a roller 167 carried on a lever 168. One end of this lever is shown in Fig. 3, the other end is suitably pivoted to a lug 169 on the frame 46. A rod 170 is pivoted at 171 to the end of the lever 168, substantially beneath the roller 167. The other end of this rod is pivoted at 173 to an arm 174 of a bell crank 175, which is pivotally carried on the post 149 heretofore mentioned. The other arm 177 of this bell crank carries a projection 178 bearing against a cam 180 rigid on the cam shaft 98. The spring 181 attached to the arm 177 and to the frame box 96 acts to keep the projection 178 carried by the bell crank against the cam 180. This cam 180 is so shaped that it operates the bell crank to move the clutch member 164 through the connections described: first, in position to drive the scroll ring to open the chuck, and then in position to close it, and then to a neutral position during the remainder of the movements, that is, during the milling operation.

The entire operation of our mechanism is briefly, as follows:

The milling cutter 40 is thrown out of the cut by means of the cam 123 swinging the arm 45. The feeding mechanism of the chuck is disconnected by means of the cam 118, causing the gear 112 to be unclutched from the clutch member 115. The quick motion driving mechanism is clutched with the driving shaft, by means of the cam 153 operating the clutch member 104, thus driving the shaft 90, and the mechanism driven by it more rapidly during what may be called "idle movements," that is the replacing of the cap in the chuck and the returning of the parts to starting position. After the speed of the machine has thus been increased, the cam 180 through the connections described, moves the clutch member 164 into position to drive the gear 28 to rotate the scroll ring of the chuck to open the jaws. The collet containing the cap is then removed by hand or by an automatic feeding mechanism, and the clutch member 164 is again shifted to cause the gear 28 and the scroll ring to be driven in the opposite direction, closing the jaws onto the cap, after which this clutch member is shifted to a neutral position allowing the gear 28 and the gears 161 and 162 to rotate freely as the chuck is rotated, during the milling operation. At this time the cam 153, through the connections described, acts to shift the clutch member 104 into engagement with the collar 100, thus driving the shaft 90 at a slower speed, through the change gears, as described. Substantially at the same time, the gear 112 is raised so that it is clutched with the shaft 98, in which position it acts to drive the gear 34, and through the connections described, rotates the chuck one and slightly more revolutions. As soon as the chuck begins to rotate, the cutter is fed into the cut by the cam 123, where it is held for slightly more than one rotation of the chuck. After the milling operation, the gear 112 is again unclutched, allowing the spring 36 to return the chuck to its starting position where it is stopped and locked during the opening and closing of the chuck for replacing the cap.

This mechanism for stopping the return movement of the chuck and locking it during the replacing of the cap, is as follows: Referring to Fig. 6, 184 is a lever pivoted at 185 to a projection rigid on the machine, and having an upwardly turned nose 186 adapted to engage a notch 187 in lower edge of the bearing portion 15 of the chuck. This nose is pressed upwardly to engage the notch, by means of a spring 188 between the lever and the frame of the machine. On the return movement the notch 187 in the chuck first passes freely over the nose of the lever, and the next time is engaged by it. The nose 186 is held down and out of the path of the shoulder by means of the lower edge of the chuck member engaging a block 189 pivotally carried on the lever near pivot 185. The chuck moves downwardly a short distance in the one rotation, which bears down slightly on the block 189, moving the lever 184 downwardly, and because the nose of the lever is much farther from the pivot than the block 189, the nose of the lever is moved downwardly enough to clear the notch the first time it passes, but the second time the chuck moves upwardly and allows the lever to come up against the chuck member 15, and engage the notch under the influence of the spring, thus stopping the chuck on its return movement. One side of the notch is beveled to allow the lever to slide out when the chuck is moved by the feeding mechanism, but the action of the spring 188 is strong enough to lock the chuck against the action of the gear while opening and closing the chuck.

It will be seen from the foregoing description, that we have produced a rapid automatically operated machine by which we accomplish the desired objects.

Having thus described our invention, what we claim is:

1. In a milling machine, the combination of a chuck comprising a body, and jaws carried by the body, a ring arranged concentric with the chuck on the outside of the body and having scroll threads for moving the jaws, the jaws having teeth engaged with the scroll threads, and means coacting with the ring for actuating the same to open and close the jaws, said means being located at one side of the axis of the chuck and coacting with the ring, substantially as and for the purpose described.

2. In a milling machine, the combination of a rotatable chuck comprising a body, jaws carried by the body, a ring arranged concentric with the chuck and having scroll threads for moving the jaws, the jaws having teeth engaged with the scroll threads, driving means and connections between the driving means and the ring for automatically rotating the ring first in one direction and then in the other, said connections coacting with the ring and located at one side of the axis of the chuck and including means for effectively disconnecting the driving means from the ring between the movements thereof in opposite directions, substantially as and for the purpose specified.

3. In a milling machine, the combination of a rotatable chuck comprising a body, and jaws carried by the body, a ring arranged concentric with the chuck, and normally rotatable therewith and having scroll threads for moving the jaws, the jaws having teeth engaged with the scroll threads, a power shaft and connections between the power shaft and the ring, and means by which said connections may be actuated in opposite directions from the power shaft to open and close the jaws, and automatic means operated by the power shaft to control and time the operation of the former means, substantially as and for the purpose set forth.

4. In a milling machine, the combination of a chuck comprising a body and jaws carried by the body, a ring arranged concentric with the chuck and having scroll threads for moving the jaws, the jaws having teeth engaged with the scroll threads, a power shaft, connections between the power shaft and the ring, and means by which said connections may be actuated in opposite directions from the power shaft to open and close the jaws, said means including a clutch section shiftable from a neutral position in opposite directions, and means for automatically shifting the clutch section at predetermined intervals, substantially as and for the purpose described.

5. In a milling machine, the combination of a chuck comprising a body, and jaws carried by the body, a ring rotatably mounted in the chuck, and normally rotatable therewith and having scroll threads for moving the jaws, the jaws having teeth engaged with the scroll threads, the ring being also formed with gear teeth, a shaft, a gear mounted on the shaft and meshing with the teeth of the ring, a second gear mounted on said shaft, a power actuated shaft, a pair of gears loosely mounted on the power actuated shaft and meshing with the second gear on opposite sides thereof, a clutch mounted on the power shaft and shiftable from a neutral position into engagement with one or the other of said pair of gears, and means for automatically shifting the clutch at predetermined intervals in the cycle of movement of the machine, substantially as and for the purpose specified.

6. In a milling machine, the combination of a rotatable chuck, means for rotating the chuck in one direction and a spring for rotating the chuck in the opposite direction, substantially as and for the purpose set forth.

7. In a milling machine, the combination of a rotatable chuck, a support for the chuck, the chuck and its support being connected by screw threads concentric with the chuck whereby during the rotation of the chuck it is also fed axially, and means for rotating the chuck comprising a power shaft and connections between the shaft and the chuck for rotating the chuck, and means for connecting and disconnecting said connections and the power shaft, substantially as and for the purpose specified.

8. In a milling machine, the combination of a chuck, a support for the chuck, the chuck and its support being connected by screw threads whereby during the rotation of the chuck it is also fed axially, means for rotating the chuck comprising a power shaft and connections between the shaft and the chuck for rotating the chuck in one direction, means for connecting and disconnecting said connections and the power shaft, and a spring for returning the chuck in the opposite direction, substantially as and for the purpose set forth.

9. In a milling machine, the combination of a chuck comprising a body, and jaws carried by the body, a ring arranged concentrically with the chuck and normally rotatable therewith, the ring being connected to the jaws to open and close the same, a support for the body connected thereto by screw threads, means for rotating the ring relatively to the chuck and means for rotating the chuck comprising a power shaft, connections between the power shaft and the chuck and between the power shaft and the ring, and means for automatically controlling and timing the operations of said connections by the power shaft, substantially as and for the purpose specified.

10. In a milling machine, the combination of a chuck comprising a body, and jaws carried by the body, a support for the chuck connected thereto by screw threads, a ring rotatably mounted on the chuck, and being normally rotatable therewith, the ring being connected to the jaws to open and close the same, said ring and chuck being formed with gear teeth, a power shaft, connections between the shaft and the teeth of the chuck, and between the shaft and the teeth of the ring, said connections comprising gear wheels meshing with the teeth of said chuck, and the teeth of the ring, and automatically operated means actuated by the power shaft for controlling and timing the operations of said connections, substantially as and for the purpose set forth.

11. In a milling machine, the combination of a rotatable chuck, a multiple rotating thread cutter movable laterally relatively to the axis of the chuck and into and out of engagement with the work held by the chuck, a power shaft, connections between the shaft and the chuck and between the shaft and the cutter, and automatic means controlling and timing the operations of the movable parts, said connections operating to hold the cutter in engagement with the chuck while the chuck is making a little more than a complete revolution and thereby lapping the threads and moving the cutter out of engagement with the work, substantially as and for the purpose described.

12. In a milling machine, the combination of a chuck comprising a body and movable jaws carried by the body, a cutter, a carriage therefor, means for opening and closing the jaws, a power shaft, connections between the shaft and the chuck and the cutter carriage for rotating the chuck and for operating the carriage, connections between the shaft and the jaws, actuating means for the power shaft including change speed gearing and means for controlling and timing the operations of said connections and the changes in the speed gearing whereby the cutter is actuated and the chuck rotated at a comparatively slow speed while the cutter is engaged with the work and the jaws are opened and closed and the cutter shifted away from and toward the work and the chuck returned to its normal position at a faster speed, substantially as and for the purpose specified.

13. In a milling machine, the combination of a chuck including a body, jaws carried by the body, an element operating to open and close the jaws, a rotating cutter, a movable carriage for the cutter, a power shaft, power transmitting connections between the shaft and the chuck and said element, the cutter and the carriage therefor, means for controlling and timing the operations of said connections including means by which said element is operated, and the chuck and cutter carriage returned to their starting position at a greater speed during the idle period in the cycle of movement of the machine than during the working period of said cycle, substantially as and for the purpose set forth.

14. The combination of a chuck having a body portion, slidable jaws therein, a scroll threaded ring for moving the jaws, means for automatically rotating the ring, means for rotating the chuck, a threaded bearing on which the chuck is mounted, and a cutter adapted to form threads on an article held in the chuck.

15. The combination of a chuck having a body portion, slidable jaws therein, a scroll threaded ring for moving the jaws, means for automatically rotating the ring, means for rotating the chuck in one direction, means for returning the chuck to starting position, a threaded bearing on which the chuck is mounted, and a cutter adapted to form threads on an article held in the chuck.

16. In a thread milling machine, the combination of a chuck body, jaws carried in said body, a scroll ring surrounding a portion of the body and adapted to move the jaws in the body, means for driving the scroll ring to open and close the chuck, means for driving the chuck in one direction, and a spring for rotating it in the other direction.

17. In a thread milling machine, the combination of a chuck body, jaws carried in said body, a scroll ring surrounding a portion of the body adapted to move the jaws in the body, means for driving the scroll ring to open and close the chuck, means for driving the chuck in one direction, a cutter adapted to mill threads while the chuck is driven one rotation, and a spring for returning it to starting position.

18. The combination of a chuck, a threaded bearing for said chuck, means for rotating the chuck, a multiple cutter adapted to cut a series of parallel grooves, a spindle carrying the cutter, the axis of said spindle being at an angle with the axis of the chuck, said angle corresponding to the pitch angle of the threads, a pivoted carrier for the spindle, and change gears for driving the chuck and the cutter spindle.

19. In a thread milling machine, the combination of a chuck, means for rotating the chuck, a threaded bearing for the chuck whereby the chuck is moved along its axis when rotated, a cutter, a spindle carrying the cutter, an arm carrying the spindle, means for swinging the arm to bring the cutter into and out of the cutting position, and an adjustable means on said arm for regulating the depth of the cut.

20. The combination in a thread milling machine, of a chuck, means for automatically opening and closing the chuck, means for rotating the chuck, a threaded bearing for the chuck whereby it is moved along its axis when rotated, a multiple cutter adapted to cut a series of parallel grooves, a spindle carrying said cutter, a swinging arm carrying said spindle, the axis about which the arm swings and the axis of the cutter being parallel and at an angle to the axis of the chuck, said angle being substantially equal to the pitch angle of the thread, and means for driving the cutter spindle to rotate the cutter.

21. The combination in a thread milling machine, of a chuck, means for opening and closing the chuck, means for rotating the chuck in one direction for milling, means for returning it to starting position, a threaded bearing for the chuck whereby it is moved along its axis when rotating, a multiple cutter adapted to cut a series of parallel grooves, a spindle carrying said cutter, a swinging arm carrying said spindle, the axis about which the arm swings, and the axis of the cutter being parallel and at an angle to the axis of the chuck, said angle being substantially equal to the pitch angle of the thread.

22. The combination in a thread milling machine, of a chuck for holding an article to be milled, means for rotating the chuck, a cutter adapted to mill threads on an article held in the chuck, a swinging arm carrying said spindle, the axis of said spindle being at an angle to the axis of the chuck, said angle corresponding to the pitch angle of the thread to be milled, means for swinging the arm to bring the cutter into cutting position and returning it to an inoperative position, a driving means for the chuck, and means operated by a portion of the last mentioned means for opening and closing the chuck.

23. In a machine for milling internal threads, the combination of a chuck, a gear driving means for opening and closing the chuck, a gear driving means for rotating the chuck, a cutter adapted to form threads on an article carried in the chuck, a spindle, a swinging arm carrying said spindle, a cam for swinging said arm to bring the cutter into operative position, and cams for controlling such movements.

24. In a machine for milling internal threads, the combination of a chuck, a gear driving means for opening and closing the chuck, a gear driving means for rotating the chuck in one direction and independent means for returning the chuck to starting position, a cutter adapted to form threads on an article carried in the chuck, a spindle for the cutter, a swinging arm carrying said spindle, a cam for swinging said arm to bring the cutter into operative position, and cams for controlling the intermittent driving of the chuck.

25. The combination of a chuck, a threaded bearing for the chuck whereby the chuck is moved along its axis as the chuck is rotated, means for rotating the chuck in one direction, a spring for rotating it in the opposite direction, and means for stopping the chuck on its return movement.

26. The combination of a chuck, a threaded bearing for the chuck whereby the chuck is moved along its axis as the chuck is rotated, means for driving the chuck in one direction, a spring for rotating it in the opposite direction, means for opening and closing the chuck, means for stopping the chuck on its return movement and locking it while being opened and closed.

27. The combination of a chuck, a threaded bearing for the chuck whereby the chuck is moved along its axis as the chuck is rotated, means for driving the chuck in one direction, a spring for rotating it in the opposite direction, and means for stopping the chuck on its return movement, the action of which is dependent upon the movement of the chuck along its axis.

28. The combination of a chuck, a threaded bearing for the chuck whereby the chuck is moved along its axis as the chuck is rotated, means for driving the chuck in one direction, a spring for rotating it in the opposite direction, means for stopping the chuck on its return movement, the action of which is dependent upon the movement of the chuck along its axis, and means for opening and closing the chuck, said means being driven by friction.

29. In a thread milling machine, the combination of a chuck, means for automatically opening and closing the chuck, means for driving the chuck in one direction more than a complete rotation, a spring for returning the chuck to its starting position, and a stop allowing the chuck to pass freely on one rotation and engaging it on the second.

30. In a thread milling machine, the combination of a scroll chuck, means for automatically opening and closing the chuck, means for driving the chuck in one direction more than a complete rotation, a spring for returning the chuck to its starting position, a stop adapted to engage the chuck to hold it in its starting position while the chuck is being opened and closed, said stop allowing the chuck to pass freely on one rotation and engaging it on the second.

31. The combination in a thread milling machine, of a chuck, means for rotating the chuck intermittently in one direction, means for returning the chuck to its starting position, means for opening and closing the chuck, a clutch controlling the opening and closing means, a clutch controlling the chuck driving means, a cam for operating each of these clutches, and a cam driven by said cam shaft for controlling the chuck driving means.

32. The combination in a thread milling machine, of a chuck, means for automatically opening and closing the chuck, means for rotating the chuck intermittently in one direction, means for rotating the chuck intermittently in the opposite direction, a cutter for milling the threads on an article held in the chuck, means for moving the cutter into and out of cutting position, means for driving the cutter, and means for rotating the machine faster during the return of the chuck and during the opening and closing of the chuck.

33. The combination in a thread milling machine, of a chuck, frictionally driven means for automatically opening and closing the chuck, means for rotating the chuck intermittently in one direction, means for returning the chuck to starting position, a cutter for milling a complete thread on an article held in the chuck, substantially one rotation thereof, means for moving the cutter into and out of cutting position, means for driving the cutter, means for rotating the machine faster during the return of the chuck and during the opening and closing of the chuck, and means for automatically controlling the time of such operation.

34. The combination in a thread milling machine, of a chuck, means for rotating the chuck intermittently in one direction, means for returning the chuck to its starting position, means for opening and closing the chuck, a cam for controlling the chuck rotating means, and a cam controlling the opening and closing means.

35. In a thread milling machine, the combination of a scroll chuck, means for automatically opening and closing said chuck, means for rotating the chuck intermittently in one direction slightly more than one rotation, means for releasing said last named means, means for automatically returning the chuck to starting position, a cutter, a spindle for said cutter, a swinging carrier for the spindle, a cam controlling the movement of the cutter into and out of cutting position, a shaft for said cam also adapted to drive the chuck driving means, and means for driving said shaft and the chuck opening and closing means.

36. In a thread milling machine, the combination of a chuck, means for automatically opening and closing said chuck, means for rotating the chuck intermittently in one direction somewhat more than one rotation, means for releasing said last named means, means for automatically returning the chuck to starting position, a cutter, a spindle for said cutter, a swinging carrier for the spindle, a cam controlling the movement of the cutter into and out of cutting position, a shaft for said cam also adapted to drive the chuck driving means, change gears for driving said last named shaft, a clutch for controlling the connection between the change gears and said shaft, and a second more direct driving means, and said clutch controlling the action of said means with said shaft.

37. In a thread milling machine, the combination of a chuck, means for rotating the chuck, a clutch controlling said means, a cam for operating the clutch, a shaft on which the cam is mounted, a second shaft, means thereon for driving the cam shaft, two sets of gearing for rotating said shaft at different speeds, means for opening and closing the chuck, and means on said shaft for driving said opening and closing means.

38. In a thread milling machine, the combination of a chuck, means for rotating the chuck, a clutch for controlling said means, a shaft for said clutch means for opening and closing the chuck, and means for driving the opening and closing means and for driving said shaft, a cam on said shaft for controlling said driving means, and a cam for controlling the opening and closing means.

39. In a thread milling machine, the combination of a rotatable chuck, means for rotating said chuck, a shaft for driving said means, a clutch on said shaft controlling said means, a cutter, a carrier for the cutter, and a cam on said shaft for moving the cutter into operative position, a second shaft, means thereon for driving the first mentioned shaft, means for opening and closing the chuck, means on the shaft for driving said opening and closing means, a cam on the first mentioned shaft, a cam on such shaft for controlling said last named driving means, means for rotating the second named shaft at two different speeds, and means on the first mentioned shaft for controlling the said driving means.

40. In a thread milling machine, the combination of a chuck, mechanism for rotating the chuck intermittently, mechanism for opening and closing the chuck, a cutter, means for swinging the cutter into and out of operative position, means for driving said mechanism at two different speeds, a cam shaft, and cams on said cam shaft for controlling said mechanisms and said means.

In testimony whereof, we hereunto affix our signatures in the presence of two witnesses.

OSCAR ZERK.
GEORGE W. DRAKE.

Witnesses:
BRENNAN B. WEST,
ALBERT H. BATES.